United States Patent [19]

Snyder

[11] 4,146,869
[45] Mar. 27, 1979

[54] ULTRASONIC ANTENNA ASSEMBLY

[75] Inventor: Ellery P. Snyder, Norwalk, Conn.

[73] Assignee: Bindicator Company, Port Huron, Mich.

[21] Appl. No.: 837,615

[22] Filed: Sep. 28, 1977

Related U.S. Application Data

[60] Continuation-in-part of Ser. No. 736,510, Oct. 28, 1976, abandoned, which is a division of Ser. No. 560,244, Mar. 20, 1975, Pat. No. 4,000,650.

[51] Int. Cl.$^2$ .......................... G01F 23/28; G01S 9/68
[52] U.S. Cl. ................................. 340/1 L; 340/8 FT; 73/290 V; 181/155
[58] Field of Search ............. 340/1 L, 8 FT; 181/166, 181/155; 73/290 V; 310/326; 343/914, 912

[56] References Cited

U.S. PATENT DOCUMENTS

| | | | |
|---|---|---|---|
| 2,943,296 | 6/1960 | Fryklund | 340/1 L |
| 3,109,155 | 10/1963 | Degen | 340/15 |
| 3,696,436 | 10/1972 | Yokoi et al. | 343/782 |
| 3,742,442 | 6/1973 | Leyde et al. | 340/15 |
| 3,867,996 | 2/1975 | Lou | 181/155 |
| 3,912,954 | 10/1975 | Baird | 340/8 FT |
| 3,978,486 | 8/1976 | Reinders | 343/781 EA |
| 3,982,142 | 9/1976 | Goble | 340/8 FT |
| 4,050,056 | 9/1977 | Massa | 340/8 FT |

FOREIGN PATENT DOCUMENTS 1077579 3/1960 Fed. Rep. of Germany ........ 340/8 FT

OTHER PUBLICATIONS

*Oil and Gas Journal,* vol. 54, No. 39, pp. 275, 278, Jan. 1956.

*Primary Examiner*—Maynard R. Wilbur
*Assistant Examiner*—Lawrence Goodwin
*Attorney, Agent, or Firm*—Barnes, Kisselle, Raisch & Choate

[57] ABSTRACT

In an ultrasonic antenna assembly specifically adapted for use in a material level control system and of the type which includes a parabolic reflector and an ultrasonic energy source mounted at the parabolic focus and directed to radiate energy toward the reflector surface from the direction of the parabolic axis, the improvement comprising a sonic absorber of low-density fiberglass disposed at the reflector surface opposite the energy source to absorb energy directed onto said surface from said source, such that multiple reflections between the energy source and the reflector surface are inhibited.

In a modified embodiment the parabolic reflector and energy source are adapted to be mounted in the upper portion of a storage tank such that the parabolic axis is substantially horizontal, and a plane reflector is disposed adjacent the parabolic reflector at an angle of forty-five degrees with respect to the parabolic axis.

6 Claims, 9 Drawing Figures

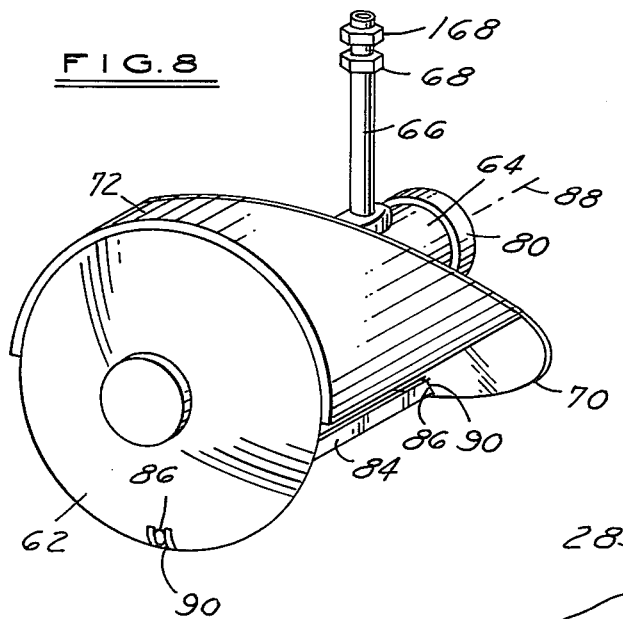

ULTRASONIC ANTENNA ASSEMBLY

This application is a continuation-in-part of copending application Ser. No. 736,510 filed Oct. 28, 1976, now abandoned, which was a division of application Ser. No. 560,244 filed on Mar. 20, 1975 copending therewith, now U.S. Pat. No. 4,000,650.

The present invention relates to distance measuring devices and, more particularly, to an ultrasonic device for measuring the level of material in a storage tank or bin.

It has heretofore been suggested that ultrasonic measuring techniques be used for monitoring or measuring the level of material in a storage tank or bin. As shown in the U.S. Pat. Nos. of Fryklund 2,943,296 and Baird 3,912,954, for example, an ultrasonic transducer or antenna assembly may be mounted to the top of the storage tank and may be directed to transmit pulses downwardly toward, and to receive echo pulses reflected upwardly from, the upper surface of a stored material, the transmitted or echo pulses traveling through the "head space" or air between the tank top and the material surface. Suitable electronic processing means, typically an analog signal processor, are provided to yield an indication of material level by measuring the round-trip transit time of a transmit/echo pulse sequence.

It has been found that problems presented by technical parameters such as signal-to-noise ratio, antenna response and antenna directivity, for example, are often amplified when it is attempted to measure distance within a closed environment such as within a material storage tank. In an open or unconfined distance measuring system, a relatively small percentage of the energy radiated by the transducer energy source is returned thereto in the form of echo signals, the remaining energy being dissipated in the surrounding environment. In a system for measuring material level within a storage tank, however, a much higher percentage of the radiated energy is eventually returned to the transducer directly from the material surface and/or after multiple reflections from the material surface, the tank walls and the tank top, etc. In such a confined system, it becomes particularly important to be able to select the true echo signal from the object of interest, in this case the upper surface of the stored material, from the other echo signals received after multiple reflections.

Another problem with ultrasonic antennas of the type shown in the referenced Baird patent, for example, lies in the provision of a substantially horizontal plane radiating surface on the ultrasonic energy source. With antennas of this type, particularly when utilized within the demanding confines of a storage tank, it has been found that dirt particles, etc. may collect on the radiating surface and effectively absorb ultrasonic energy transmitted therethrough. Energization of the transducer source does not remove the dust to the extent desired to restore normal operation; rather, the build-up must be physically removed to restore peak antenna efficiency.

Accordingly, it is an object of the present invention to provide an economical and reliable ultrasonic distance measuring apparatus which is particularly well suited for material level control.

It is another object of the present invention to provide an ultrasonic material level control apparatus in which, for a specified range, resolution and accuracy, the level distance measuring capability is substantially increased.

A further object of the invention is to provide an ultrasonic transducer and antenna assembly which is particularly well adapted for use in the dusty environment of a material storage tank or bin.

The invention, together with additional objects, features and advantages thereof, will be best understood from the following description when read in conjunction with the accompanying drawings in which:

FIG. 8 is a perspective view of the antenna assembly of FIG. 6; and

FIG. 9 is a sectional view taken along the line 9—9 in FIG. 6.

Figure 1:
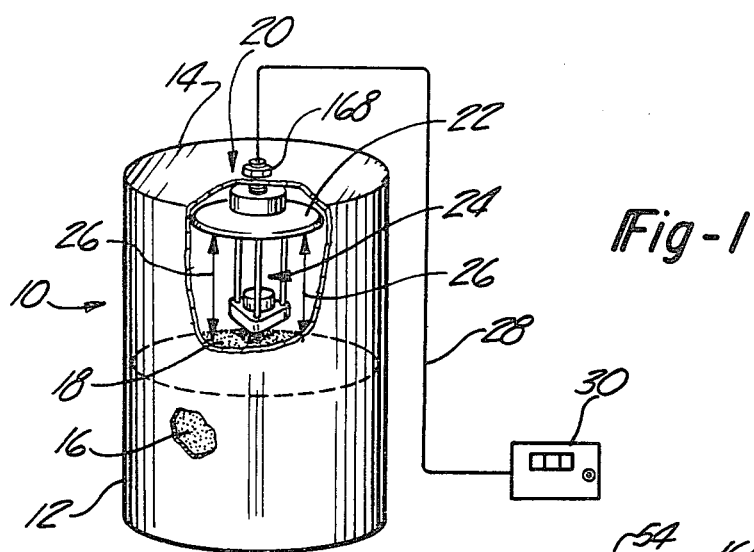
FIG. 1 is a perspective view, partially in section, of a material storage tank in which material level is monitored in accordance with the present invention, the antenna assembly being shown on an enlarged scale relative to the tank.

Referring to FIG. 1, a material storage tank 10 is depicted as having a cylindrical side wall 12 and a top 14. A material 16 which may be a liquid, or a solid such as grain, coal or rocks, for example, is stored in tank 10 and has an upper surface 18 which is to be monitored to provde an indication of material level. It will be understood that tank 10 may be made of any suitable material and will be provided with suitable means (not shown) for filling and draining material 16 into and from the tank.

In accordance with the present invention, a transducer or antenna assembly 20 is interiorly mounted in the upper portion of tank 10 to depend from tank top 14, and comprises a parabolic reflector 22 and an ultrasonic energy source of transducer 24 mounted at the reflector focus. Reflector 22 directs or reflects pulsed ultrasonic wave energy emanating upwardly from transducer 24 downwardly toward surface 18 as at 26 and, similarly, receives echo pulses reflected upwardly from surface 18, and reflects and directs the echo pulses to transducer 24, the transmitted and echo pulses traveling through the "head space" or air between tank top 14 and material surface 18. Antenna assembly 20 is connected by means of a coaxial cable 28 to material level control electronics 30.

A presently preferred embodiment of control electronics 30 is disclosed in detail in the above-referenced parent application now U.S. Pat. No. 4,000,650. Such electronics do not, per se, form part of the present invention. The discussion of electronics 30 in such patent is incorporated herein by reference.

Figure 2:
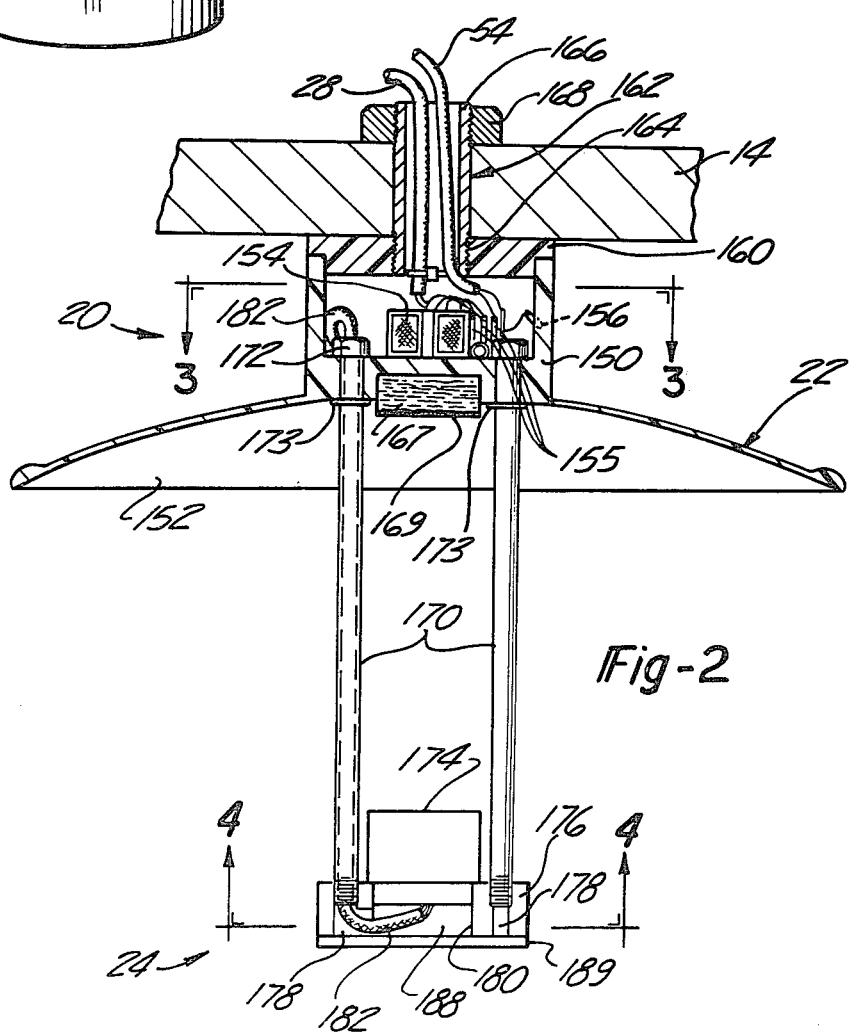
FIG. 2 is a sectional view vertically bisecting the antenna assembly shown in FIG. 1.
Figure 3:
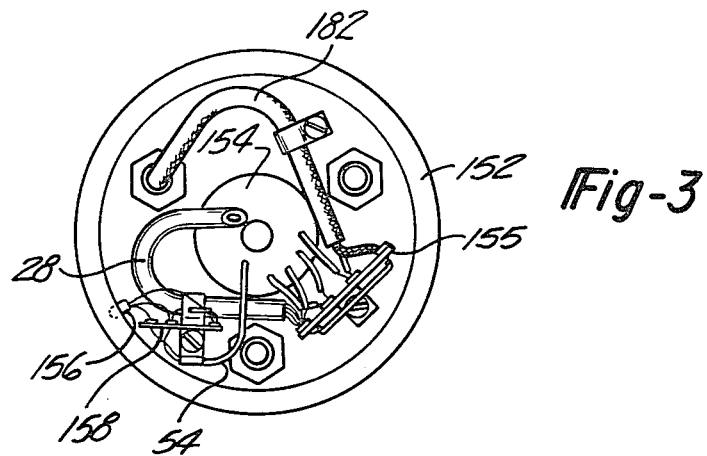
FIG. 3 is a sectional view taken along the line 3—3 of FIG. 2.
Figure 4:
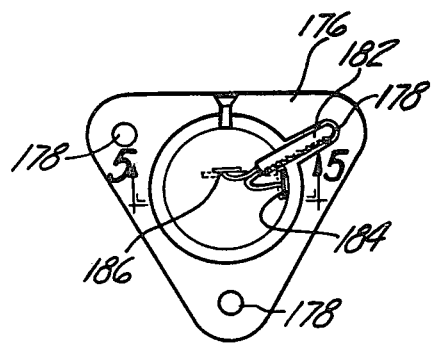
FIG. 4 is a sectional view taken along the line 4—4 of FIG. 2.

The structure of one presently preferred embodiment of transducer or antenna assembly 20 is shown in detail in FIGS. 2–5 which are all drawn to scale. Referring to FIGS. 2-4, parabolic reflector 22 is molded of plastic-reinforced fiber glass and includes an integral cylindrical reflector housing 150 extending vertically from the reflector proper 152. Enclosed within housing 150 is an impedance matching pulse transformer 154 having primary and secondary windings wound upon a toroidal core of ferromagnetic material in a preferred secondary/primary winding ratio of 5/1. By thus providing the pulse transformer in the transmitter/transducer line, the transmitter and transducer are respectively matched to the line impedance while, at the same time, a 25/1 impedance increase between the line and the transducer is achieved. This results in a significant improvement in power transmission efficiency between the transmitter and transducer, and the transducer and receiver. Moreover, location of the pulse transformer at the transducer remotely of the control electronics allows the use of a low impedance cable to connect the control electronics to the transducer and places the high voltage circuits of the system within a protection enclosure at the transducer.

The transformer windings are connected to a terminal strip 155, the primary winding being then connected to control electronics 30 (FIG. 1) via cable 28. A thermistor 156 is embedded in the wall of housing 152 and is connected via a second terminal strip 158 (FIG. 3) and a cable 54 to control electronics 30 (FIG. 1) to facilitate compensation in electronics 30 for changes in pulse travel time through air due to changes in ambient temperature within bin 10. A reflector housing cover 160 is press fitted over and bonded to housing 152 and receives one threaded end 164 of a transducer mounting nipple 162. Housing 152 is then filled with a suitable encapsulant such as RTV. A second threaded nipple end 166 is adapted to receive a locking nut 168 to firmly secure transducer assembly 20 to tank top 14. An acoustic absorber block 167 is centrally mounted in reflector 154 opposite transducer 24 to inhibit generation of standing waves between the transducer and the reflector. Preferably, block 167 comprises a section of low-density fiberglass material, such as a pad of conventional home wall or ceiling insulation, for example. Block 167 is held in place by a screen 169.

Three parallel, hollow, nickel plated steel rods or tubes 170 are secured to reflector 22, as by nuts 172 and grip rings 173, and support ultrasonic transducer 24 at the reflector focus. A triangular mounting block 176 of plastic-reinforced fiber glass has the threaded holes 178 at respective triangle apexes to receive the respective threaded ends of support tubes 170. The open end of a transducer cup assembly 174 is axially pressed into a central bore 180 in block 176. A cable 182 is connected to terminal block 155 and then fed through one of the support tubes 170 to connect the secondary of transformer 154 to the cup assembly terminals 184,186. The cavity 188 (FIG. 2) formed by cup assembly 174 and block 176 is filled with RTV encapsultant, and a cover 189 is bonded to block 176 to cover the cavity and tube holes 178.

Figure 5:
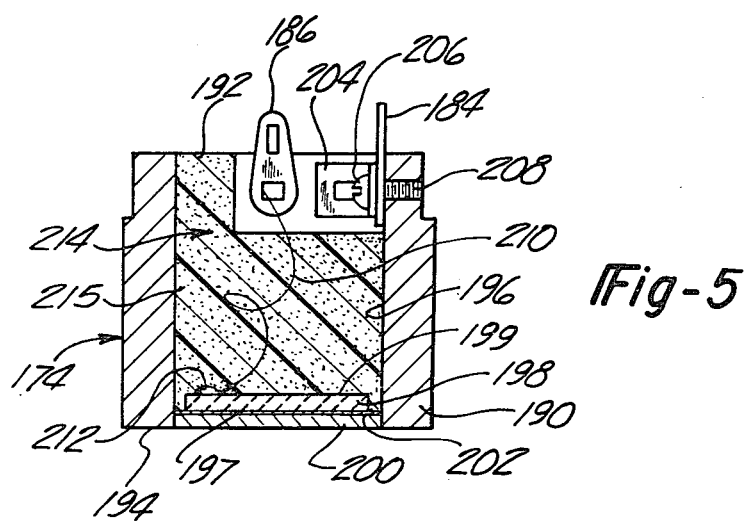
FIG. 5 is a sectional view laterally bisecting the transducer cup assembly shown in FIGS. 1, 2 and 4 but inverted relative to FIG. 2, and is taken along the line 5—5 of FIG. 4.

Referring now to FIG. 5, transducer cup assembly 174 includes a hollow aluminum shell 190 having an axial cylindrical bore 196 opening at shell ends 192,194. A piezoelectric crystal 198 having opposed, parallel front and back faces 197,199 is adhered to an aluminum transducer face plate or diaphragm 200 by a layer 202 of bonding material the external or crystal-remote plane surface of diaphragm 200 comprising the energy radiating surface of transducer 24. When crystal 198 is energized by electronics 30 (FIG. 1), the crystal and diaphragm 200 form an oscillating "composite beam" which is subjected to internal bending stresses. The neutral bending axis of the crystal/diaphragm combination is preferably located in bonding layer 202, or within diaphragm 200 closely adjacent the bonding layer to insure that crystal 198 is subjected to either tensile or compressive stresses, but not simultaneously to both, thereby reducing the likelihood of crystal of diaphragm. The bonding agent is preferably conductive, such as silver-doped epoxy or silver-loaded solder. Diaphragm 200 is pressed into end 194 of shell 190 with an interference fit after one or both of the interfitting peripheral surfaces have been coated with a suitable anaerobic filling agent to fill in the gaps between the diaphragm perimeter and the shell wall.

A terminal strip 204 is mounted to shell 190 by a screw 206 received into a corresponding threaded opening 208 in the shell wall. Terminal 184 is electrically connected to screw 206, and thence to shell 190, diaphragm 200, bonding layer 202 and crystal face 194 to connect that crystal face to ground via cable 182. Terminal 186 on strip 204 is connected to back crystal face 199 via a conductor 210 and a solder joint 212.

An acoustical absorber block 214 fills the remainder of cavity 196 and is preferably comprised of a resilient synthetic material such as RTV and a nonconductive particulate material such as sand or quartz mixed in an RTV/particle ratio of 5/1 to 20/1 by weight. The particulate material, indicated in FIG. 5 as grains 215, increases the density of absorber 214, and helps break up and absorb the ultrasonic waves emanating from crystal back face 199. The RTV/particle mixture also lowers the Q of the transducer, which is generally defined in the transducer art as the ratio of the resonant frequency divided by the bandwidth at the transducer half power point. A Q in the range between 14 and 17 is presently preferred in material level control applications. The Q of the cup assembly without the RTV/particle absorber has been found to be generally between 70 and 90. It has also been found that absorber 214 lowers the resonant frequency of the assembly by 200 to 300 Hz.

The ultrasonic transducer cup assembly 174 shown in FIGS. 2 and 4-5 herein is the subject of a copending application of Walter E. Levine, Ser. No. 560,245 filed Mar. 20, 1975, now U.S. Pat. No. 4,015,319 assigned to the assignee hereof. Said Levine patent, which discusses transducer cup assembly 174 in greater detail, is incorporated herein by reference. The transducer cup assembly disclosed herein does not, of itself, form part of the present invention. However, it does constitute part of the presently preferred mode for using the apparatus for ultrasonic material level control provided by the present invention.

Figure 6:
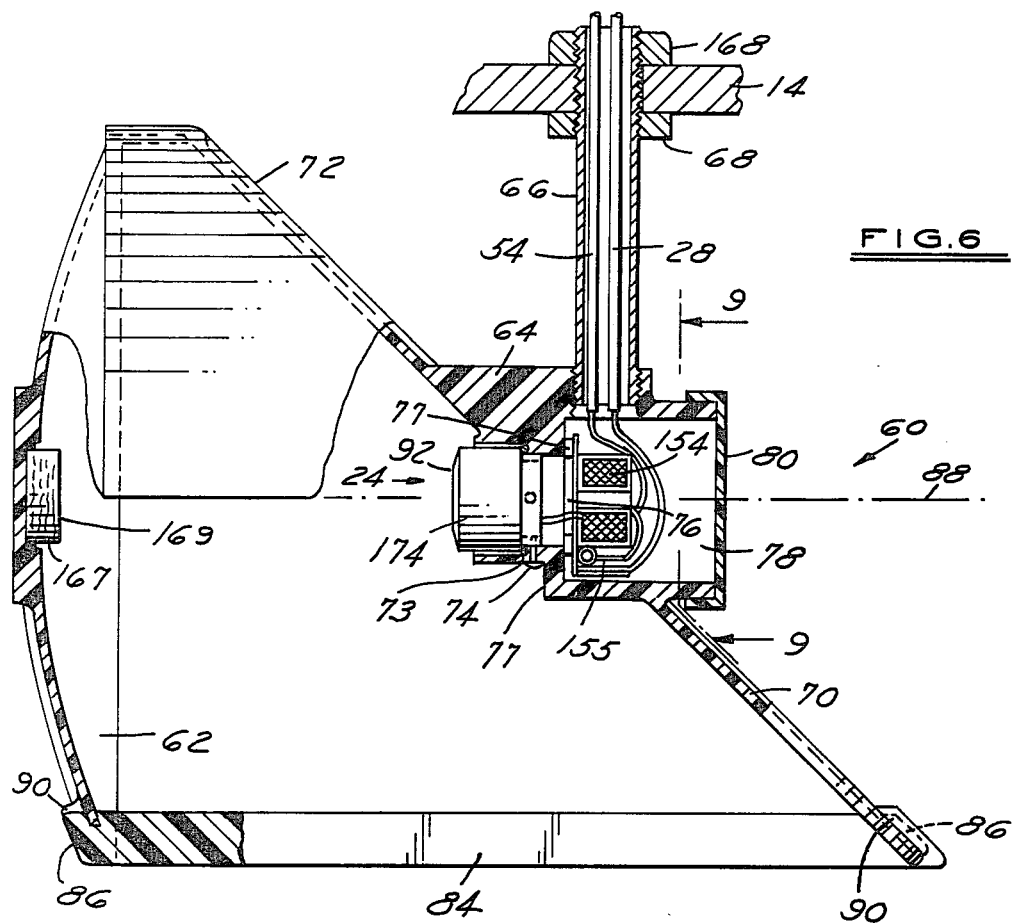
FIG. 6 is a sectional view vertically bisecting an alternative embodiment of the antenna assembly in accordance with the invention.
Figure 7:
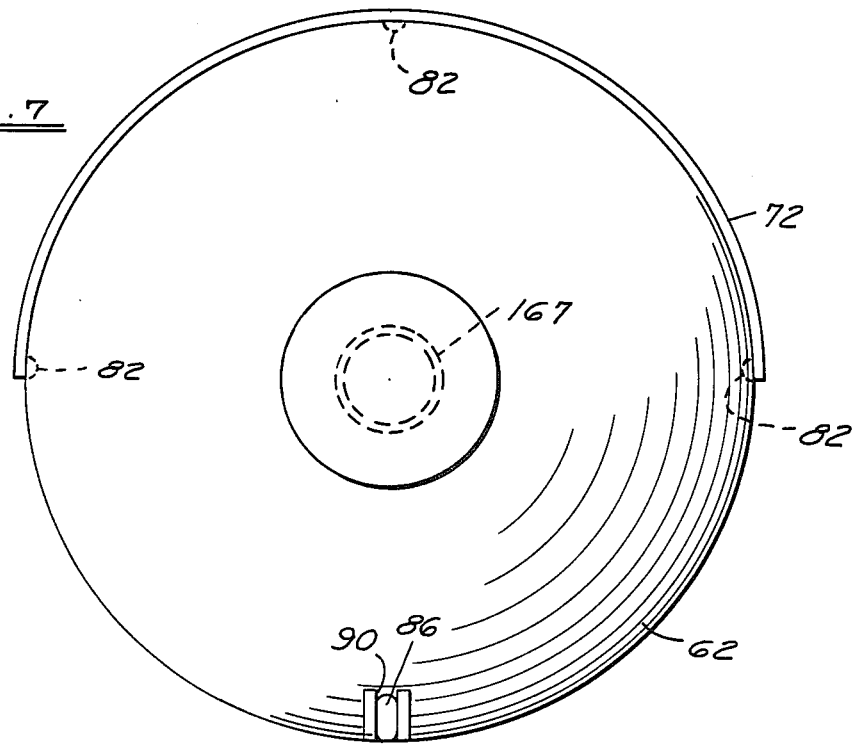
FIG. 7 is a side elevational view of the antenna assembly shown in FIG. 6.

An alternative embodiment 60 of the antenna assembly provided by the invention is illustrated in FIGS. 6-9, wherein reference numerals identical to those utilized in connection with FIGS. 1-5 indicate identical elements. Referring to FIGS. 6-9, antenna assembly 60 comprises a transducer mounting block 64 interiorly suspended from tank top 14 by a hollow pipe 66 threadably received therein and nuts 68,168 received on the remote end of pipe 66 against the opposing surfaces of top 14. Connection cables 28,54 are fed through pipe 66 as shown in FIG. 6. A plane reflector 70 is formed by a flange integrally extending angularly outwardly from block 64. A semicylindrical dust shroud or cowling 72 is formed integrally with reflector 70 and extends horizontally therefrom over an arc of one hundred eighty degrees, as best seen in FIG. 7. Transducer cup assembly 174 is received in a corresponding aperture in block 64 substantially centrally of reflector 70 against a sealing ring 73 (FIG. 6) and is held therein by a set screw 74. Transformer 154 and terminal blocks 155,158 (FIGS. 6 and 9) are carried by a plate 76 mounted on bosses 77 (FIG. 6) within an interior cavity 78 in block 64, and are connected to thermocouple 156 (FIG. 9), transducer cup assembly 174 and electronics 30 (FIG. 1) as hereinabove described. Cavity 78 may be filled with an appropriate sealant (not shown) and is covered by a cap 80 (FIG. 6).

A parabolic reflector 62 has absorber 167 mounted thereon by a screen 169 as hereinabove described. Nubs 82 (FIG. 7) on the inside surface of shroud 72 are received in corresponding recesses in the outer periphery of reflector 62, and a support strut 84 couples the lower edges of reflector 62,70 with the notched ends 86 of strut 84 being received by interferrence press fit in corresponding slots 90 in the respective reflector edges. A suitable adhesive is placed between the abutting surfaces of shroud 72 and reflector 62 and, if desired, between strut 84 and reflector 70,62. Parabolic reflector 62 is thereby cantilevered in fixed position by shroud 72 and strut 84 with the parabolic axis 88 (FIG. 6) of reflector 62 being oriented in a generally horizontal direction in alignment with transducer cup assembly 174 and at an angle of forty-five degrees with respect to plane reflector 70. As with the embodiment of FIGS. 1–5, the energy-radiating surface 92 (FIG. 6) of transducer cup assembly 174 is disposed at substantially the parabolic focus of reflector 62 in opposed relation thereto.

Thus, sonic wave energy transmitted from surface 92 travels in a generally diverging spherical wave pattern to the opposing surface of reflector 62 which reflects the wave energy toward reflector 70 in a generally collimated pattern. The collimated energy is the incident upon and reflected from the opposing surface of plane reflector 70 which direct such energy downwardly, still in a generally collimated pattern, toward material surface 18 (FIG. 1). Similarly, echo signals from surface 18 are directed by reflector 70 onto reflector 62 and thence focussed onto radiating surface 92. In the embodiment of FIGS. 6–9, radiating surface 92 is disposed in a substantially vertical plane, such that dust, etc. from the surrounding environment does not collect thereon. Moreover, shroud 72 not only serves the pupose of locating and supporting reflector 62 (in cooperation with strut 84) but also covers and thereby tends to shield transducer cup assembly 174 from dust and flying particles.

Although the present invention has been described in connection with a material level control system in which a single antenna assembly is rigidly and fixedly mounted to the top of a material storage tank and is monitored by control electronics in a 1/1 antenna/electronics ratio, it will be apparent that other antenna and-/or control electronics configurations may be advantageous. For example, control electronics 30 would be useful in a material level control environment in conjunction with a movable or moving antenna. An example of such an antenna would be one that is rigidly mounted to the tank top but which swivels or pivots about its mounting point in a periodic pattern so as to direct radiated pulses toward the material surface at selected angles, thereby "sweeping" an enlarged material surface area. Another example of a mobile antenna would be one that is rigidly mounted in the vertical direction but which moves as on a boom or beam in a plane below the tank top so as to, again, sweep an enlarged surface area in a preselected pattern. In either such application, the material control system 30 may be used to "map" the contour of the upper surface of the material. Additional control circuitry to correlate antenna position with measuring distance must, of course, be provided. Such additional circuitry is generally well known to those skilled in the art.

Control circuit 30 may also be readily adapted for use with multiple antennas, each antenna being mounted to the top of an individually selected storage tank. In this application, circuitry for selecting one antenna from the plurality of antennas, such as a rotary switch or a stepping relay, would be provided. Additionally, circuitry correlating measured distance with the selected antenna, i.e., the selected material storage tank, would also be provided. It will also be appreciated from the foregoing discussion that the antenna assembly in accordance with the invention may be suspended in the upper portion of a storage tank other than by mounting the same to the tank top, such as by mounting the antenna to a tank side wall or to a support bracket or stanchion extending from the tank side wall or bottom. Accordingly, the present invention is intended to embrace the above-noted and all other alternatives, modifications and variations as fall within the spirit and broad scope of the appended claims.

The invention claimed is:

1. An antenna assembly for use in measuring the level of stored material comprising a source of ultrasonic wave energy which includes a plane energy-radiating surface, first means for mounting said energy source above the upper surface of stored material such that said radiating surface is disposed in a substantially vertical plane, a plane reflector carried by said first means surrounding said source at an angle of forty-five degrees with respect to said radiating surface, a parabolic reflector, and second means cantilevering said parabolic reflector such that said energy source is disposed on the axis of said parabolic reflector at substantially the focus thereof.

2. In a system for monitoring the level of material in a storage tank including an antenna assembly adapted to be mounted at the top of said tank for directing ultrasonic pulses downwardly through air toward and receiving echo pulses reflected upwardly through air from an upper surface of said material, the improvement wherein said antenna assembly comprises a parabolic reflector having a substantially horizontal parabolic axis, a source of pulsed ultrasonic wave energy having a plane energy-radiating surface disposed in a vertical plane at the focus of said parabolic reflector, a plane reflector mounted at an angle of forty-five degrees with respect to said parabolic axis in spaced relation to said parabolic reflector such that energy radiated from said energy-radiating surface is reflected in turn by said parabolic reflector and said plane reflector downwardly toward said material surface as said measurement pulses, cover means extending between said plane reflector and said parabolic reflector and defining a downwardly facing opening for passing therethrough said measurement pulses, and means including said cover means for suspending said antenna assembly interiorly of said tank such that said cover means is disposed above said reflectors and cooperates with the vertical orientation of said plane energy-radiating surface to retard accumulation of dust on said surface and on the energy reflecting portions of said reflectors.

3. The improvement set forth in claim 2 wherein said means including said cover means comprises first means for suspending said plane reflector interiorly of said tank and second means including said cover means cantilevering said parabolic reflector from said plane reflector.

4. The improvement set forth in claim 3 wherein said cover means comprises a cowling extending axially between said plane reflector and said parabolic reflector and circumferentially over an arc of substantially 180°.

5. The improvement set forth in claim 4 wherein said means for suspending said plane reflector includes a mounting block in which said energy source is disposed, said plane reflector being formed by a flange integrally extending outwardly from said block.

6. The antenna set forth in claim 3 further comprising a low density fiberglass pad disposed on said parabolic reflector opposite said energy-radiating surface to absorb energy directed onto said parabolic reflector from said surface and thereby inhibit multiple direct reflections between said surface and said parabolic reflector.

* * * * *